United States Patent [19]

Hager et al.

[11] Patent Number: 5,541,254
[45] Date of Patent: Jul. 30, 1996

[54] ELASTOMER MODIFIED POLYESTER SMC

[75] Inventors: William G. Hager, Reynoldsburg; Jay J. Beckman, Newark; Paul R. Krumlauf, Thornville, all of Ohio

[73] Assignee: Owens Corning Technology, Inc., Summit, Ill.

[21] Appl. No.: 364,590

[22] Filed: Dec. 27, 1994

[51] Int. Cl.$^6$ .............................. C08L 67/06; C08G 81/02
[52] U.S. Cl. .................... 515/44; 515/43; 515/90; 515/166; 515/168; 515/169; 515/171; 515/445
[58] Field of Search ...................... 525/171, 169, 525/44, 166, 43, 168, 90, 445

[56] References Cited

U.S. PATENT DOCUMENTS

| | | |
|---|---|---|
| 3,546,319 | 12/1970 | Prevorsek et al. . |
| 3,620,900 | 11/1971 | Williger . |
| 3,674,893 | 7/1972 | Nowak et al. . |
| 3,806,490 | 4/1974 | Kajiura et al. . |
| 3,857,812 | 12/1974 | Nowak et al. . |
| 3,882,078 | 5/1975 | Kubota . |
| 4,160,758 | 7/1979 | Gardner . |
| 4,160,759 | 7/1979 | Gardner et al. . |
| 4,290,939 | 9/1981 | Bertsch et al. . |
| 4,558,096 | 12/1985 | Boon et al. . |
| 4,731,413 | 3/1988 | Droscher et al. . |
| 4,851,474 | 7/1989 | Willis ................................ 525/171 |
| 5,006,581 | 4/1991 | Nakane et al. . |
| 5,242,994 | 9/1993 | Nield et al. . |
| 5,244,972 | 9/1993 | Phadke . |
| 5,260,378 | 11/1993 | Gandini et al. . |
| 5,268,452 | 12/1993 | Siebert et al. . |
| 5,362,819 | 11/1994 | McBain ............................... 525/404 |

*Primary Examiner*—Patricia A. Short
*Attorney, Agent, or Firm*—C. M. Gegenheimer; Patrick P. Pacella; Inger H. Eckert

[57] ABSTRACT

This development relates to elastomer modified polyester for sheet molding compound (SMC). This development copolymerizes the rubber with the polyester. The reaction provides copolymers with extended storage times without phase separation. It also enhances impact resistance of the molded part.

20 Claims, No Drawings

ELASTOMER MODIFIED POLYESTER SMC

TECHNICAL FIELD

This development relates to an elastomer modified polyester sheet molding compound (SMC). Specifically, this development relates to elastomer modified polyester for improved impact resistant SMC. Further, it is well known that the incorporation of rubber into polyesters significantly lowers the temperature at which laminates begin to soften and hence lowers the upper temperature bound where they will be useful (sometimes called the heat distortion temperature or HDT). This development also relates to using these compositions for applications in the automotive industry.

BACKGROUND ART

Unsaturated resin compositions are finding increased use in the automotive industry in SMC formulations from which component parts, especially body panels, can be molded. The unsaturated resin compositions contain, in addition to the unsaturated polyesters and monomer components, so called "low-profile" additives which are thermoplastic polymers that act to prevent undesirable shrinkage as the composition is being molded into a thermoset article. Of particular note recently has been efforts to improve the impact resistance of exterior automotive body panels. One skilled in the field knows that polyester body panels display quite brittle behavior in impact tests relative to traditional materials (e.g. steel). The cause of the low impact resistance generally lies in the dual performance required for these materials: superior reproduction of the mold surface (excellent surface aesthetics) in addition to the usual stiffness and strength requirements typically requires the formulator to employ highly reactive unsaturated polyesters in addition to high amounts of thermoplastic (low profile additive).

The formulators also know that blending rubbers with thermosets may improve impact resistance by absorbing the energy of impact and delaying the onset of catastrophic failure. However, adding certain hydrocarbon rubbers to polyesters appears to degrade impact resistance. In the example of simply blending poly(butadiene- co-acrylonitrile) rubber and unsaturated polyester, incompatibility between the rubber and polyester leads to phase separation on a macroscopic scale. Thus, if one blends polyester with rubber and then immediately cures it, the rubber particles apparently assume a very large size and act as failure sites. Further, it is not possible to preblend rubber and polyester for later molding since during storage phase separation occurs between the components and usually gives a rubber phase above the polyester phase. In addition, when rubber is employed to improve impact resistance, adhesion, etc. of polyesters, the useful upper service temperature (HDT) significantly decreases. This is due to the lower glass transition temperature of the rubber relative to the pure thermoset.

DISCLOSURE OF INVENTION

The above situation is greatly improved if rubber is incorporated into the polyester chain. The resulting molecular structure may be visualized as of the $(AB)_n$ type, wherein A constitutes polyester segments and B rubber segments. This structure allows significantly better compatibility of rubber and polyester, resulting in a single phase on storage. In this scenario, the rubber phase exists as extremely small rubbery domains dispersed in the polyester phase. Further, incorporation of unsaturated end groups to increase the cross link density of the resulting polyester multi-block polymer significantly improves the HDT, nearly to that of the unmodified resin.

In the method of Siebert, et al. (U.S. Pat. No. 5,268,452), the use of several end functionalized reactive liquid polymers (named RLPs) based on the poly(butadiene- co-acrylonitrile) family are discussed. This patent encompasses such end groups as carboxy, hydroxy and epoxy. It teaches the addition of any of the RLPs with the above end groups at the beginning of the polyester preparation, regardless of polyester component choice, is sufficient to incorporate the rubber into the polyester backbone.

We have found that only combination of specific RLPs with carefully modified polyesters will result in successful incorporation of rubber into the polyester backbone. Thus, care must be taken in choice of rubber as well as the polyester components if macrophase separation is to be prevented. Overall, attempts to enhance the compatibility between the components are necessary. A convenient measure of compatibility between two polymers is the solubility parameter, $\delta$, (Grulke, E. A., in "Solubility Parameters", Polymer Handbrook, 3rd ed., J. Brandup and E. H. Immergut, eds., John Wiley and Sons, N.Y.,1989). In styrene, $\delta$ for most polyesters ranges from 9 to 13 $(cal/cm^3)^{1/2}$ while for most hydrocarbon rubbers it ranges from 7.5 to 8.5 $(cal/cm^3)^{1/2}$. If $\Delta\delta$, the difference in solubility values for two components, is greater than about 1 $(cal/cm^3)^{1/2}$, the components will phase separate in most cases. Since most polyesters tend toward the higher end of the range and rubbers to the lower, single phase solutions of blended rubber and polyester over time have not been observed.

BEST MODE OF CARRYING OUT THE INVENTION

We have found a route to the synthesis of $(AB)_n$, copolymers of polyester and hydrocarbon rubbers that allow excellent compatibility as displayed by extended storage times without phase separation and enhanced impact resistance.

A convenient choice for the rubber component is a copolymer of butadiene and acrylonitrile. The rubber employed generally displays a $\delta$ in the 7 to 12 $(cal/cm^3)^{1/2}$ range. Preferably, $\delta$ ranges from 7.5 to 9.5 $(cal/cm^3)^{1/2}$. An acrylonitrile content of the rubber of at least 20% (higher levels give $\delta$ values closer to that of polyester) is preferred. For ease of process, the robber generally should display a low viscosity. Reactive functional groups must be attached to the chain ends of the rubber and be accessible to reaction with polyester chain ends (e.g., epoxy groups). The robber may consist of copolymers with other components such as isoprene, cyclopentadiene and the like.

The polyester generally displays a $\delta$ in the range of 8 to 13 $(cal/cm^3)^{1/2}$ and preferably 8 to 12. The polyester must be of generally low viscosity and high acidity before reaction of robber with the polyester. The polyester generally is synthesized with groups (modifiers) that add considerable hydrophobicity to the alkyd. We have found the most useful modifier to be dicyclopentadiene from both a cost and performance standpoint. Long hydrocarbon chain acids such as 1,10- dodecanedicarboxylic acid and the like, as well as long chain glycols are also useful in adding hydrophobicity to the alkyd.

Other modifiers such as glycidyl-acrylates, propoxylated allylalcohol and the like will improve HDT. The glycidyl-acrylates are represented by the formula:

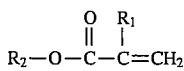

wherein $R_1$ is hydrogen or an alkyl radical having 1 to 5 carbon atoms, and $R_2$ is a glycidyl ester group having the formula:

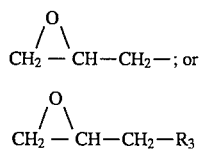

wherein $R_3$ ranges from $C_7H_{14}O_3-$ to $C_{11}H_{20}O_3-$, wherein the glycidylacrylates terminate some of the low molecular weight unsaturated polyester with unsaturated end groups.

The unsaturated polyester comprises the polycondensation reaction product of one or more dihydridic alcohols and one or more ethylenically unsaturated polycarboxylic acids. By polycarboxylic acid is generally meant the polycarboxylic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon-to-carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which include O-phthalic, isophthalic, terephthalic, succinic, adipic, sebacic, methyl-succinic, and the like. Dihydric alcohols that are useful in preparing the polyesters include 1,2-propane diol (hereinafter referred to as propylene glycol), dipropylene glycol, diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acids; (4) propylene glycol, maleic and/or fumaric acids and dicyclopentadiene reacted with water. In addition to the above described polyesters, one may also use dicyclopentadiene modified unsaturated polyester resins as described in the Pratt et al., U.S. Patent No. 3,883,612.

The monomer component of the resinous system comprises materials that copolymerize with the unsaturated polyester. The ethylenically unsaturated monomer that is copolymerizible with the unsaturated polyester is most generally styrene, however, methyl-styrene is also useful, as are acrylates and methacrylates such as methyl-acrylates, ethylacrylate, methylmethacrylate, ethyl methacrylate, etc.

The low-profile additive component of resinous system comprises the thermoplastic polymers which cause phase separation and porosity during the curing reaction. Low-profile additives are materials that when mixed in an unsaturated polyester and cured, result in a multi-phase system. Some polymers that are useful as low-profile additives include homopolymers and copolymers of acrylic and methacrylic acid esters, cellulose acetate butyrate, vinyl acetate homopolymers and copolymers, polyrethanes prepared from polyisocyanates, preferably diisocyanates, and polyether polyols, numerous saturated polyesters, polycaprolactone, styrenebutadiene copolymers, some modified celluloses, and certain alkyl oxide polymers. The above list of low-profile additives is not intended to list all low-profile additives but rather to show examples of materials which have been used to cause the multi-phase morphology present in low profile resins.

The acid number to which the polymerizable unsaturated polyesters are condensed generally ranges from 10 to 50 mg KOH/g resin. Preferably, the acid number ranges from 15 to 40 mg KOH/g resin. The weight average molecular weight of the unsaturated polyester prior to reaction with rubber ranges from 500 to 5,000 g/mole. Preferably, the molecular weight ranges from 750 to 2,500 g/mole. After reaction with rubber, the molecular weight ranges from 5,000 to 30,000 g/mole. Preferably, the molecular weight after reaction with rubber ranges from 10,000 to 20,000 g/mole.

In one aspect of the invention, a reactor is loaded with diacids and glycols, inhibitors etc. Polycondensation is carried out at 175° to 240° C. When the acid value of the polyester reaches a value of 55 to 85, the reaction mass is cooled to 110° to 150° C., at which time catalysts and inhibitors are added. Then the rubber is added and the reaction mass held at temperature for 30 to 60 minutes. The final acid value ranges from 17 to 35 mg KOH/g resin. The mass is then cooled and let down into styrene.

In another aspect of the invention, a reactor is loaded with diacids and glycols, inhibitors and dicyclopentadiene. Polycondensation is carried out at 175° C. to 240° C. When the acid value of the polyester reaches a value of 55 to 85, the reaction mass is cooled to 110° C. to 150° C., at which time catalysts and inhibitors are added. Then the rubber is added and the reaction mass held at a temperature of 30 to 60 minutes. The final acid value ranges from 17 to 35 mg KOH/g resin. The mass is then cooled and let down into styrene.

In another aspect of the invention, a reactor is loaded with diacids and glycols, inhibitors etc. Polycondensation is carried out at 175° C. to 240° C. to an acid value of less than 10 mg KOH/g resin. Maleic anhydride and dicyclopentadiene are then added and the Condensation is continued. When the acid value of the polyester reaches a value of 55 to 85, the reaction mass is cooled to 110° C. to 150° C., at which time catalysts and inhibitors are added. Then the rubber is added and the reaction mass held at a temperature for 30 to 60 minutes. The final acid value ranges from 17 to 35 mg KOH/g resin. The mass is then cooled and let down into styrene.

In another aspect of the invention, a reactor is loaded with diacids and glycols, inhibitors etc. Polycondensation is carried out at 175° C. to 240° C. to an acid value of less than 10 mg KOH/g resin. Maleic anhydride and dicyclopentadiene are then added and the condensation is continued. When the acid value of the polyester reaches a value of 55 to 85, the reaction mass is cooled to 110° C. to 150° C., at which time catalysts and inhibitors are added. Then the rubber is added and the reaction mass held at a temperature for 30 to 60 minutes. The final acid value after reaction with rubber ranges from 25 to 35 mg KOH/g resin. The reaction mass is cooled further to 105° C. to 130° C. and a second catalyst and inhibitors are added. Further, oxygen is allowed to enter the reactor by an air sparge at a sufficient rate. At this point, glycidyl methacrylate is added at such a rate so as to prevent the reaction from heating above 130° C. After the addition of GMA is complete, the reactor is held at 120° C. to 130° C. for 1 hour to complete the reaction. At this point, the mass is let down into styrene and cooled.

In another aspect of the invention, a reactor is loaded with diacids and glycols, inhibitors etc. Polycondensation is carried out at 175° C. to 240° C. When the acid value of the polyester reaches a value of 55 to 85, the reaction mass is cooled to 110° C. to 150° C., at which time catalysts and inhibitors are added. Then the rubber is added and the reaction mass held at a temperature for 30 to 60 minutes. The final acid value after reaction with rubber ranges from 25 to 35 mg KOH/g resin. The reaction mass is cooled further to 105° C. to 130° C. and a second catalyst and inhibitors are added. Further, oxygen is allowed to enter the reactor by an air sparge at a sufficient rate. At this point, glycidyl methacrylate is added at such a rate so as to prevent the reaction from heating above 130° C. After the addition of GMA is complete, the reactor is held at 120° C. to 130° C. for 1 hour to complete the reaction. At this point, the mass is loaded with styrene and cooled.

In yet another aspect of the invention, a reactor is loaded with diacids and glycols. Polycondensation is carried out at 175° C. to 240° C. When the acid value of the polyester reaches a value of 100 to 120 mg KOH/g resin, a sufficient amount of propoxylated allyl ether is added to the reactor. Also, a catalyst and inhibitors are added and the reactor is heated at 200° C. Condensation is carried out until the acid value reaches 55 to 80 mg KOH/g resin. The reaction mass is cooled to 110° C. to 150° C., at which time catalysts and inhibitors are added. Then the rubber is added and the reaction mass held at a temperature for 30 to 60 minutes. The final acid value ranges from 17 to 35 mg KOH/g resin. The mass is then cooled and let down into styrene.

The sheet molding compound of this invention also may include other conventional materials. For example, conventional chemical thickeners may be physically mixed into the resin. The chemical thickeners generally include metal oxides, hydroxides and alkoxides of Group II, III or IV from the Periodic Table. Calcium oxide and magnesium oxide or the respective hydroxides are most often employed. In preferred embodiments, the thickener is present in amounts ranging from about 0:5 to about 6 parts, by weight. The thickener is generally suspended in a carrier resin, as is known in the art. The carrier material comprises a composition which does not react with the thickener such as, for example, polymethylmethacrylate, polyvinylacetate, saturated or unsaturated polyesters and similar materials. The carrier resin is present in amounts ranging from about 0.5 to about 8 parts, by weights, based on one hundred parts of the system.

Catalysts also may be incorporated in small amounts into thermosetting polyester resins containing ethylenically unsaturated monomer to aid in curing or cross-linking the unsaturated polyester with the monomer. Such catalysts are well known and may be similarly utilized in this invention to aid in curing the unsaturated polyester and monomer mixed with the low-profile thermoplastic polymer. Typical catalysts, for example, include organic peroxide and peracids such as tertiary butyl perbenzoate, tertiary butyl peroctoate, benzoyl peroxide and the like. The amounts of catalysts may be varied with the molding process and similarly varied with the level and types of inhibitors utilized, in a manner well known in the art. In preferred embodiments of the catalyst is present in amounts ranging from about 0.5 to about 2.5 parts, by weight, based on one hundred parts of the system.

Curing of the composition is carried out under heat and pressure typically, in closed, preferably positive pressure type molds. Mold release agents may be added to the compositions to perform their normal function, as is well understood in the art. In preferred embodiments, the mold release agents are present in amounts ranging from about 0.5 to about 6.0 parts, by weights, based on hundred parts of the four component resin system.

Fibers, fillers and pigments normally added to resin compositions can be likewise in formulating the sheet molding composition of this invention. Reinforcing fibers or fibrous reinforcement is taken to mean glass fibers in one form or another, such as glass fabrics, chopped glass strands, chopped or continuous strand glass fiber mat; however, the terms also include reinforcing agents which may also be used if desired, for example, asbestos, cotton, synthetic organic fibers and metals. Fillers, usually inert, and inorganic material useful with the compositions include, for example, clay talc, calcium carbonate, silica, calcium silicate, and the like. In preferred embodiments, the fillers are-present in amounts ranging from about 165 to about 250 pans, by weight, based on one hundred pan of the system.

Examples of pigments include carbon black, iron oxide, titanium dioxide, and the like, as well as organic pigments. In preferred embodiments, the pigments are present in mounts ranging from about 0 to about 4 pans, by weight, based on one hundred pans of the four component resinous system.

In one aspect of the present invention, the preparation of the sheet molding composition is generally carried out by blending together a first portion comprising the unsaturated polyester, the low-profile additive, the monomer, and such additives as a catalyst, mold release agent and fillers. This is generally known in the industry as the A-side formulation. The second portion (generally known as the B-side formulation) comprises the thickening agent and a carrier resin therefor, and such additives as pigments and mold release agents. In another aspect of the invention, an additional or secondary monomer may be is added to the B-side formulation in which the thickener is suspended. The additional monomer comprises vinyl toluene or styrene and is present in amounts ranging from about 1 to 8 pans, by weight, based on one hundred pans of the four component resinous system.

The sheet molding composition of the present invention can be prepared by mixing the components in a suitable apparatus of temperatures which are conventional and known to those skilled in the art. Once the sheet molding composition is formulated, the composition can be molded into thermoset articles having a desired shape. The actual molding cycle will, of course, depend upon the exact composition being molded. In preferred embodiments, suitable molding cycles are conducted at temperatures ranging from about 250°–350° F. for periods of time ranging from about ⅓ to about 5 minutes.

The following formulations are provided to illustrate examples of the compositions of the present invention.

INDUSTRIAL APPLICABILITY

EXAMPLE I

Into a 4 liter reactor fitted for polyester condensation is placed:

471 g isophthalic acid 378 g dipropylene glycol 254 g 2-methyl-1,3-propanediol.

The contents are allowed to react at 200° C. with a nitrogen gas flow to remove water until the acid value is 9.5 mg KOH/g resin. At this point, the following are added:

821 g maleic anhydride 510 g dicyclopentadiene.

The reaction is held at 155° C. for 30 minutes. At this point, the following is added to the reactor:

378 g dipropylene glycol
254 g 1-methyl-1,3-propanediol
0.5 g Toluhydroquinone.

The reactor is heated to 195° C. and reaction is allowed to proceed until a Gardner timed bubble of 6.0 1/100 min. (2:1 resin:styrene) and an acid value of 35 is reached. The reactor is cooled to 130° C. and the following is added:

3.4 mL N,N-dimethylbenzylamine
350 g EPI-REZ 58042 (epoxy-terminated poly(butadiene-co-acrylonitrile), acrylonitrile content 26%, acid value=1.5, viscosity=500,000 cps at 20° C., $\delta$=9.15 $(cal/cm^3)^{1/2}$, number average molecular weight=3,150 g/mole, Tg=39° C.).

The reaction is allowed to continue at 150° C. for 1 hour. At that time, the acid value of 18 and the Gardner timed bubble viscosity was 19.5 1/100 min. The reaction mass was let down into the following mixture:

1,560 g styrene
0.0746 g para-Benzoquinone
0.16 g mono-tert-butylhydroquinone.

100 g of the resin was mixed with 1.0 g benzoyl peroxide and placed into an oven at 60° C. for 16 hours. The casting was then post cured at 120° C. for 4 hours. Table I and Table II below contain physical property data for this material.

EXAMPLE II

Into a 4 liter reactor fired for polyester condensation is placed:

463 g isophthalic acid
284 g dipropylene glycol
254 g 2-methyl-1,3-propanediol.

The contents are allowed to react at 200° C. with a nitrogen gas flow to remove water until the acid value is 6.3 mg KOH/g resin. At this point, the following are added:

850 g maleic anhydride
400 g dicyclopentadiene.

The reaction is held at 155° C. for 30 minutes. At this point, the following is added to the reactor:

395 g dipropylene glycol
202 g 1-methyl-1,3-propanediol
0.5 g Toluhydroquinone.

The reactor is heated to 195° C. and reaction is allowed to proceed until a Gardner timed bubble of 19 1/100 min. (2:1 resin:styrene) and an acid value of 83 is reached. The reactor is cooled to 130° C. and the following is added:

3.4 mL N,N-dimethylbenzylamine
333 g EPI-REZ 58042

The reaction is allowed to continue at 150° C. for 1 hour. At this point, the reactor was cooled to 125° C. and air was introduced to the mixture by a sparge line. To the reaction mass was then added:

1.0 g Butylatedhydroxytoluene (BHT)
3.4 mL N,N-Dimethylbenzlamine
0.3 g para-Benzoquinone
250 g Glycidyl methacrylate (GMA).

The GMA was added at such a rate so as not to exceed 125° C. After addition was complete, the reaction was held for 1 hour at 120° C. At that time, the acid was 35 and the Gardner timed bubble viscosity was 130 1/100 min. The reaction mass was let down into the following mixture:

1,560 g styrene
0.0746 g para-Benzoquinone
0.16 g mono- tert-butylhydroquinone.

100g of the resin was mixed with 1.0 g benzoyl peroxide and placed into an oven at 60° C. for 16 hours. The casting was then post cured at 120° C. for 4 hours. Table I and Table II below contain physical property data for this material.

TABLE I

| Mechanical Data | | | |
|---|---|---|---|
| | Control* | Example I | Example II |
| Notched Izod (J/m) | 35.3 | 39.6 | 35.6 |
| Unnotched Izod (J/m) | 94.3 | 182.2 | 140.9 |
| Flexural Stress MPa | 86.1 | 77.2 | 132.7 |
| Flexural Modulus GPa | 3.9 | 2.8 | 4.5 |
| Tensile Stress MPa | 46.6 | 46.4 | 71.3 |
| Tensile Modulus GPa | 3.1 | 2.5 | 3.6 |
| Tensile Elongn. % | 1.7 | 3.3 | 2.8 |

*Unsaturated polyester comprised of isophthalic acid/diethylene glycol/propylene glycol/maleic anhydride commonly used in impact resistant applications.

TABLE II

| Thermal Data | |
|---|---|
| Coef. of Thermal Expansion, in/in/°C. | |
| Control | 61.8 |
| Example I | 69.2 |
| Example II | 56.2 |

The data shows that the inventive compositions have mechanical and thermal properties better than the control polyester.

EXAMPLE III

To a 10 gallon stainless steel reactor fitted for polyester condensation we loaded:

3.23 kg dipropylene glycol
2.98 kg 2-methyl-1,3-propanediol
5.43 kg of isophthalic acid.

The reactor was brought to 200° C. and condensation continued until the acid value was 10 mg KOH/g resin. The reaction mass was cooled to 175° C. and the following ingredients were added:

13.03 kg maleic anhydride
3.1 kg Dicyclopentadiene.

The reaction was held at 155° C. for 30 minutes. At this point, the following is added to the reactor:

3.63 kg dipropylene glycol
2.98 kg 2-methyl-1,3-propanediol
5.0 g toluhydroquinone.

The reactor is heated to 205° C. and condensation was effected until the acid value reached 60 mg KOH/g resin. The reactor was cooled to 140° C. and the following ingredients were added:

35.0 g N,N-dimethylbenzylamine
1.57 kg ER-58042.

The rubber was allowed to react at 150° C. for 1 hour. After the reaction with rubber, the resin was cooled to 120° C. and let down into the following mixture:

34 kg styrene
0.51 g para-Benzoquinone 2.56 g mono-tert-Butylhydroquinone.

EXAMPLE IV

To a 10 gallon stainless steel reactor fitted for polyester condensation we loaded:

3.23 kg dipropylene glycol 2.98 kg 2-methyl-1,3-propanediol 5.43 kg of isophthalic acid, The reactor was brought to 200° C. and condensation continued until the acid value was 10 mg KOH/g resin. The reaction mass was cooled to 175° C. and the following ingredients were added:

13.03 kg maleic anhydride 4.63 kg dipropylene glycol 4.68 kg 1-methyl-1,3-propanediol 5.0 g toluhydroquinone.

The reactor was heated to 205° C. and condensation was effected until the acid value reached 60 mg KOH/g resin. The reactor was cooled to 140° C. and the following ingredients were added:

35.0 g N,N-dimethylbenzylamine 1.57 kg ER-58042.

The rubber was allowed to react at 150° C. for 1 hour. At this point, the reactor was cooled to 125° C. and air was introduced to the mixture by a sparge line. To the reaction mass was then added:

8,67 g Butylatedhydroxytoluene (BHT)

17.5 g N,N-Dimethylbenzlamine 0.52 g para-Benzoquinone 1.57 kg Glycidyl methacrylate (GMA).

The GMA was added at such a rate so as not to exceed 125° C. After addition was complete, the reaction was held for 1 hour at 120° C. The rubber was allowed to react at 150° C. for 1 hour. After the reaction with rubber, the resin was cooled to 120° C. and let down into the following mixture:

13 kg styrene 0.51 g para-Benzoquinone 2.56 g mono-tert-Butylhydroquinone.

| Typical SMC Formulation | | |
|---|---|---|
| Ingredient | Description | phr |
| Modified Polyester | Rubber and GMA modified | 51.1 |
| Styrene | — | 15.5 |
| S-508 | Surface enhancer/Owens Corning | 4.0 |
| TBPB | peroxide | 1.5 |
| pBQ | para-Benzoquinone | 200 ppm |
| Calcium Stearate | Mold release | 4.3 |
| Calwhite II | Filler | 220.0 |
| "B" Side | Thickeners, pigment, etc. | 16.6 |
| Glass | OC 973; total product weight | 16 oz/ft² |

SMC was made from all examples employing a formula for exterior automotive body panels. The paste and sheet showed nominal behavior in glass wet out, maturation and handling. SMC was molded at 150° C. at psi. Panels all showed remarkable smoothness of surface (Loria values in the range of 65–85 where lower the value, the smoother the surface).

We claim:

1. A composition for a sheet molding compound comprising a copolymer which is the reaction product of an elastomer and an unsaturated polyester:

wherein the elastomer is a hydrocarbon rubber having chain ends with reactive functional groups attached thereto;

wherein the polyester is a reaction product of one or more polyhydric alcohols, one or more ethylenically unsaturated polycarboxylic acids, and at least one of dicyclopentadiene, long chain hydrocarbon acids or long chain hydrocarbon glycols;

wherein the reactive functional groups attached to the chain ends of the elastomer are accessible to reaction with the polyester; and wherein the elastomer has a solubility parameter, $\delta$, ranging from 7 to 12 $(cal/cm^3)^{1/2}$, the polyester has a solubility parameter, $\delta$, ranging from 8 to 13 $(cal/cm^3)^{1/2}$, and $\Delta\delta$ is 1 or less.

2. A composition according to claim 1 wherein the elastomer has a solubility parameter, $\delta$, ranging from 7.5 to 9.5 $(cal/cm^3)^{1/2}$ and the polyester has a solubility parameter, $\delta$, ranging from 8 to 12 $(cal/cm^3)^{1/2}$.

3. A composition according to claim 1 wherein the composition is capable of being stored for extended periods of time without phase separation.

4. A composition according to claim 1 wherein the rubber is a diene rubber.

5. A composition according to claim 1 wherein the rubber is a polybutadiene rubber.

6. A composition according to claim 1 wherein the highly reactive functional groups attached to the elastomer are epoxy groups.

7. A composition according to claim 1 wherein the elastomer contains at least 20% acrylonitrile.

8. A composition according to claim 1 wherein the copolymer includes chain ends with reactive functional groups attached thereto and the reactive functional groups attached to the chain ends of the copolymer are selected from the group consisting of glycidyl-acrylates, carboxyl modified allylic compounds and hydroxyl modified allylic compounds.

9. A composition according to claim 8 wherein the reactive functional group attached to the chain ends of the copolymer is propoxylated allyl alcohol.

10. A composition according to claim 8 wherein the reactive functional group attached to the chain ends of the copolymer is glycidyl-acrylate or glycidyl methacrylate.

11. The composition of claim 1 including one or more olefinically unsaturated monomers which copolymerizes with the polyester.

12. The composition of claim 1 including one or more low-profile thermoplastic polymers which cause phase separation and porosity during a curing reaction.

13. A composition according to claim 1 wherein the polyester is the reaction product of isophthalic acid, dipropylene glycol, maleic anhydride and dicyclopentadiene and the elastomer is epoxy-terminated poly(butadiene-co-acrylonitrile).

14. A composition according to claim 1 wherein the polyester is the reaction product of isophthalic acid, dipropylene glycol, maleic anhydride, dicyclopentadiene and glycidyl-methacrylate and the elastomer is epoxy-terminated poly(butadiene-co-acrylonitrile).

15. A composition according to claim 1 wherein the polyester is the reaction product of isophthalic acid, dipropylene glycol, maleic anhydride and glycidyl-methacrylate and the elastomer is epoxy-terminated poly(butadiene-co-acrylonitrile).

16. A composition according to claim 1 wherein the polyester is the reaction product of isophthalic acid, dipropylene glycol, maleic anhydride and propoxylated allyl alcohol and the elastomer is epoxy terminated poly(butadiene-co-acrylonitrile).

17. The composition according to claim 13 including styrene which copolymerizes with the polyester.

18. The composition of claim 13 including one or more low-profile thermoplastic polymers.

19. Sheet molding composition including composition of claim 1.

20. Sheet molding composition including the composition of claim 13.

* * * * *